United States Patent Office 2,844,597
Patented July 22, 1958

2,844,597

BLUE LEVELING DYESTUFFS OF THE ANTHRAQUINONE SERIES

Jacques Guenthard, Basel, and Richard Roth, Rheinfelden, Switzerland, assignors to Sandoz A. G., Basel, Switzerland, a Swiss firm No Drawing. Application February 25, 1957
Serial No. 641,812

Claims priority, application Switzerland March 29, 1956

6 Claims. (Cl. 260—372)

In wool dyeing practice the dyestuffs intended for application to woven fabrics are required to possess certain properties which provide for even distribution of dyestuff both on the individual fibers and over the entire area of the cloth. These properties include good solubility in water, a slow rate of dyeing in the region of acetic acid to sulfuric acid reaction, and the ability to migrate from the sites of heavy dyestuff concentration to more lightly dyed sites. These properties are especially demanded from those dyestuffs which as yellow, red and blue form the elements for combination dyeings in every gradation of shade. The three products forming such a set must be closely co-ordinated in their rates of dyeing and leveling properties if spotty dyeings are to be avoided. Furthermore their fastness properties—particularly light fastness—must be of the same standard.

Fast, level dyeings can be obtained with the sulfuric acid dyeing dyestuffs. However, dyers are interested in finding dyestuffs which level well and at the same time give dyeings of better wet fastness than the commercially available brands. A precondition for improved fastness to wet agencies is higher affinity for wool. Yet since the dyestuffs which fulfill this requirement show poor leveldyeing properties they have to be applied from a weakly acid medium.

The anthraquinone series contains blue dyestuffs of this type which also find employment in combination with yellow and red dyestuffs possessing the same affinity and fastness properties. However these dyestuffs are not sufficiently soluble and the available range lacks members yielding bright blue shades.

It has now been found that the blue leveling dyestuffs of the anthraquinone series which correspond to the general formula

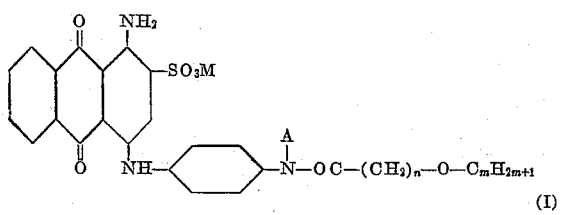

(I)

wherein A stands for hydrogen or methyl, M a monovalent cation, $n$ 1 or 2, and $m$ 2, 3, 4 or 5, do not exhibit the previously mentioned disadvantages.

These new blue leveling dyestuffs of the anthraquinone series dye wool, silk and polyamide fibers from weakly acid dyebaths in level shades of bright blue which are very fast to light and washing. In addition their solubility satisfies practical requirements, corresponding to the dyer's demands mentioned in the foregoing. The lower members of this series in particular, namely those dyestuffs in which $m$ represents 2 or 3, have a solubility of at least 10 grams per liter in a 0.6% aqueous solution of sulfuric acid at 35–40° C.

The process for the production of the new leveling dyestuffs of the anthraquinone series admits of certain variations. One procedure consists in acylating 1 mol of an anthraquinone derivative of the general formula

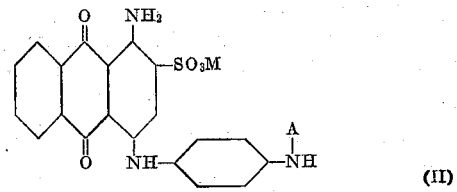

(II)

wherein A and M possess the aforementioned meanings, with 1 mol of a functional derivative of an alkoxy-fatty acid of the general formula $$C_mH_{2m+1}\text{—O—}(CH_2)_n\text{—COOH} \qquad (III)$$

wherein $m$ and $n$ have the aforenamed meanings.

An alternative procedure is to condense 1 mol of a salt of the 1-amino-4-bromoanthraquinone-2-sulfonic acid with 1 mol of a 1-amino-4-acylaminobenzene of the general formula

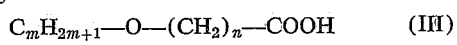

(IV)

wherein A, $m$ and $n$ possess the above-defined meanings.

A third procedure is to react an anthraquinone derivative of the general formula

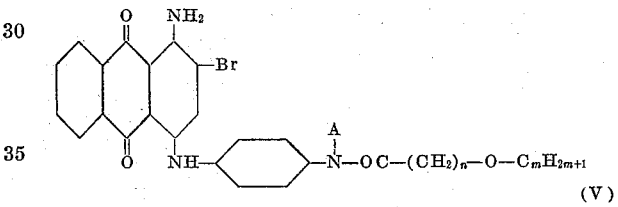

(V)

wherein A, $m$ and $n$ have the aforenamed difinitions, with an alkali-metal sulfite.

Acylation as envisaged in the first operating procedure of the process may be carried out in organic solvents such as pyridine, ethyl alcohol or propyl alcohol, though water is preferred. The medium is rendered weakly alkaline and the temperature may range from 0° to 50° C., preferably from 20° to 30° C.

The acylating agents which come within the scope of the present invention are the functional derivatives of the amyloxy-, butoxy-, propoxy- and ethoxy-propionic acids and the amyloxy-, butoxy-, propoxy- and ethoxyacetic acids, or preferably the chlorides of these acids.

In the second operating procedure, condensation of the 1-amino-4-bromoanthraquinone-2-sulfonic acid with the 1-amino-4-acylaminobenzene of Formula IV is effected advantageously in aqueous or aqueous-alcohol solution at 50–100° C. in the presence of an acid-binding agent and a copper compound as catalyst. The 1-amino-4-acylaminobenzenes employed in this instance are obtained by acylation of aniline or N-methylaniline with the chloride of an alkoxy-fatty acid of the general formula $$C_mH_{2m+1}\text{—O—}(CH_2)_n\text{—COCl} \qquad (VI)$$

wherein $m$ and $n$ have the previously stated definitions, followed by nitration of the acylation product and reduction of the nitro group.

The third operating procedure of the process, the reaction of the anthraquinone derivative of Formula V with an alkali-metal sulfite, is conducted preferably in an aqueous organic medium within the temperature range 100° to 150° C. and under pressure. It is an advantage to use a mixture of a phenol and a concentrated aqueous solution of the appropriate alkali-metal sulfite as aqueous organic medium.

The anthraquinone derivatives of Formula V used as starting materials are obtained by condensing 1-amino-2.4-dibromoanthraquinone with a 1-amino-4-acylaminobenzene of Formula IV at temperatures of 100–120° C. in presence of an acid-binding agent and a copper compound as catalyst.

The following examples illustrate the invention. All parts and percentages specified therein are by weight and the temperatures are in degrees centigrade.

EXAMPLE 1

8.5 parts of 1-amino-4-(4'-methylamino)-phenylaminoanthraquinone-2-sulfonic acid (obtainable e. g. by splitting the acetyl group from the 1-amino-4-(4'-N-acetyl-N-methylamino) - phenylaminoanthraquinone - 2 - sulfonic acid) are suspended in 50 parts of pyridine. The well stirred suspension is given 6 parts of sodium bicarbonate and is then drop-fed at 20–25° in the course of 15 minutes with 5 parts of 2-(isoamyloxy)-propionyl chloride. The mass is stirred until the starting substance is no longer indicated in a sample by chromatographic adsorption on a talc column.

The pyridine is eliminated with water-steam, and the dyestuff precipitated with salt, filtered off and dried. Upon grinding it is obtained as a violet-blue powder which dissolves easily in water. It gives a reddish blue aqueous solution which does not change color upon the addition of a little acid or caustic soda. With concentrated sulfuric acid, however, it forms a blue solution which turns green upon the addition of formaldehyde.

The new dyestuff dyes wool, silk and polyamide fibers from weakly acid dyebaths in level, reddish shades which are very fast to light and washing.

A typical dyeing procedure is as follows: 10 parts of wool fabric are introduced into a dyebath at 30° composed of 1000 parts of water, 1 part of anhydrous sodium sulfate, 0.2 part of concentrated sulfuric acid and 0.1 part of dyestuff. The dyebath is heated to 100° in about 20 minutes and maintained at this temperature for 30 minutes, after which 2 parts of a 10% aqueous sulfuric acid solution are added. The evaporated water is replaced and dyeing brought to a close in 30 minutes with constant heating to keep the bath at 100°. The wool, dyed to a reddish blue shade, is removed, rinsed with water and dried. Polyamide fibers are dyed in the same way, while for silk a dyeing temperature between 90° and 95° is chosen.

EXAMPLE 2

8.6 parts of sodium 1-amino-4-(4'-amino)-phenylaminoanthraquinone-2-sulfonate are dissolved in 400 parts of water at 60°. The solution is cooled to 20–25° and adjusted to pH 10.5–11 with sodium hydroxide solution. Then 6 parts of 2-(n-butoxy)-propionyl chloride are added in the course of 15 minutes, the pH value being kept betwen 10.5 and 11 by drop-feeding with sodium hydroxide solution. As soon as chromatography of a sample on a talc column no longer reveals the presence of the starting material, the dyestuff is precipitated from the solution with 40 parts of common salt, filtered off, washed with brine till the wash-water reacts neutral, and dried. When ground the dyestuff is a blue powder readily soluble in water. It dissolves in water with a bright blue coloration which changes to greenish blue when a drop of sodium hydroxide solution is added. In concentrated sulfuric acid it gives a blue solution which turns green on the addition of formaldehyde.

The new dyestuff dyes wool, silk and polyamide fibers from weakly acid dyebaths in level, bright blue shades of very good light and wash fastness.

EXAMPLE 3

26 parts of sodium 1-amino-4-(4'-amino)-phenylaminoanthraquinone-2-sulfonate are dissolved in 800 parts of water at 70°. The solution is cooled to about 20° with 400 parts of ice, after which simultaneous dropwise additions of 15 parts of ethoxyacetyl chloride and 30 parts of sodium hydroxide solution 30% are made over a period of 30 minutes. The mass is stirred till the starting material is no longer indicated in a sample by chromatography on a talc column.

The dyestuff is precipitated with 60 parts of common salt, filtered off and dried. When ground it is obtained as a violet-tinged blue powder, readily soluble in water and with a solubility of more than 10 grams per liter in a 0.6% aqueous solution of sulfuric acid at 35–40°. Its blue solution in concentrated sulfuric acid changes to green upon the addition of formaldehyde.

The new dyestuff dyes wool, silk and polyamide fibers from weakly acid dyebaths in level, blue shades fast to light and washing.

EXAMPLE 4

24 parts of 1-amino-4-(4'-methylamino)-phenylaminoanthraquinone-2-sulfonic acid are dissolved in 300 parts of water and 8 parts of sodium hydroxide solution 30%. After being thoroughly stirred the solution is drop-fed simultaneously at room temperature with 14 parts of sodium hydroxide solution 30% and 10 parts of 2-(ethoxy)-propionyl chloride. Following this, condensation is carried out in the manner described in Example 3.

The dyestuff obtained thus possesses similar properties to that of Example 3.

EXAMPLE 5

13 parts of 4-nitro-1-aminobenzene are suspended in 16 parts of pyridine. 16 parts of ethoxyacetyl chloride are slowly added dropwise to the suspension with stirring, during which time the temperature is raised to 100°. The resultant solution is maintained at this temperature for 1 hour; it is then run into 100 parts of water and the precipitated mass of the 4-nitro-1-ethoxyacetylaminobenzene filtered off. The filter cake is washed with water till it reacts neutral.

20.6 parts of native 4-nitro-1-ethoxyacetylaminobenzene are dissolved in 135 parts of methylalcohol, and 3 parts of alcohol-moistened Raney nickel are added to the solution. Hydrogen gas is introduced into the closed apparatus at room temperature with vigorous stirring by means of a vibrator mixer. On completion of the reaction (about 12 hours) 5 parts of filter earth and 5 parts of blood charcoal are added to the reduction solution, which is then heated to the boil over a period of 30 minutes and carefully filtered. When the alcohol has been evaporated the 4-amino-1-ethoxyacetylaminobenzene is left as a tough yellow oil which is further processed as such.

17 parts of sodium 1-amino-4-bromoanthraquinone-2-sulfonate, 8.3 parts of sodium bicarbonate, 0.4 part of copper bronze and 0.2 part of cuprous chloride are suspended in 300 parts of water. To this is added a solution of 13 parts of 4-amino-1-ethoxyacetylaminobenzene in 25 parts of alcohol. The mixture is maintained at 65° for 8 hours with stirring. Upon cooling the reaction mass is given 3 parts of common salt and the crystalline dyestuff filtered off. The filter cake is washed with a 3% common salt solution till the filtrate runs colorless. The dyestuff is dried at 100° and then ground. It is identical with the dyesteuff of Example 3.

EXAMPLE 6

A mixture of 9.5 parts of 1-amino-2.4-dibromoanthraquinone, 7 parts of 1-amino-4-ethoxyacetylaminobenzene, 5 parts of anhydrous potassium acetate, 0.1 part of copper bronze and 100 parts of n-butanol is maintained at a temperature of 115–117° for 12 hours. After this time the 1-amino-2.4-dibromanthraquinone in the reaction mass is no longer indicated. The mixture is allowed to cool, the precipitated dyestuff base suctioned off, washed with n-butanol, then with alcohol and finally with water, and then dried.

A mixture of 10 parts of this dyestuff base, 30 parts of phenol and 30 parts of a saturated potassium sulfite solution is run into an autoclave. The autoclave is closed and immersed in an oil bath, which is then heated to 140° till all the components of the mixture have been rendered water-soluble, this taking about 20 hours. When the reaction mixture has cooled it is taken out of the autoclave and treated with water-steam till the phenol has ben entirely eliminated. The dark blue solution is filtered free of minor impurities and the dyestuff precipitated from the filtrate by means of common salt. The precipitate is suctioned off, washed with a 5% common salt solution and dried.

The resultant dyestuff is identical with that of Example 3.

The following table contains further blue leveling dyestuffs of the anthraquinone series which have the general Formula I and are obtainable according to the particulars given in Examples 1 to 6. In the table they are characterized by the symbols A, $m$, $n$ and M, and by the shade of their dyeings on wool.

Table

| Example No. | A | $m$ | $n$ | M | Shade of dyeing on wool |
|---|---|---|---|---|---|
| 7 | CH$_3$ | 2 | 1 | Na | reddish-blue. |
| 8 | CH$_3$ | 3 (normal) | 1 | K | Do. |
| 9 | CH$_3$ | 3 (iso) | 1 | NH$_4$ | Do. |
| 10 | H | do | 1 | Na | blue. |
| 11 | H | 3 (normal) | 1 | Na | Do. |
| 12 | H | do | 2 | K | Do. |
| 13 | CH$_3$ | do | 2 | Li | reddish-blue. |
| 14 | CH$_3$ | 3 (iso) | 2 | Na | Do. |
| 15 | H | do | 2 | Na | blue. |
| 16 | H | 2 | 2 | Na | Do. |
| 17 | CH$_3$ | 4 (normal) | 1 | Li | reddish-blue. |
| 18 | CH$_3$ | 5 (normal) | 1 | Na | Do. |
| 19 | H | 4 (normal) | 1 | Na | blue. |
| 20 | H | 5 (iso) | 2 | NH$_4$ | Do. |
| 21 | H | 4 (iso) | 2 | Na | Do. |
| 22 | CH$_3$ | do | 2 | K | reddish-blue. |
| 23 | CH$_3$ | 5 (normal) | 2 | Na | Do. |
| 24 | CH$_3$ | 4 (normal) | 2 | Na | Do. |
| 25 | CH$_3$ | 4 (iso) | 1 | Na | Do. |
| 26 | H | do | 1 | K | blue. |
| 27 | H | 5 (normal) | 2 | Na | Do. |
| 28 | H | do | 1 | Na | Do. |
| 29 | H | 5 (iso) | 1 | Na | Do. |
| 30 | CH$_3$ | do | 1 | NH$_4$ | reddish-blue. |

Formulae of representative dyestuffs of the foregoing examples are

Example 1:

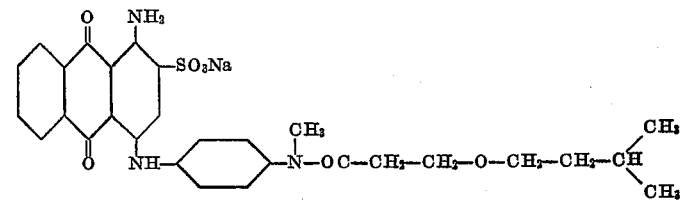

Example 2:

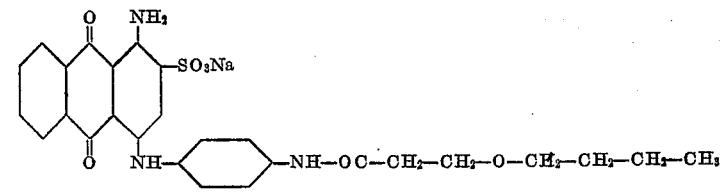

Example 3:

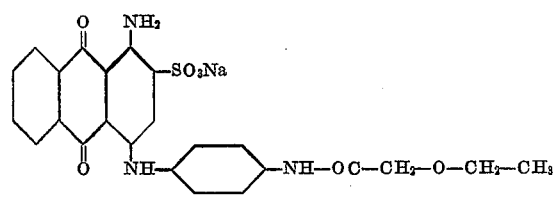

Example 4:

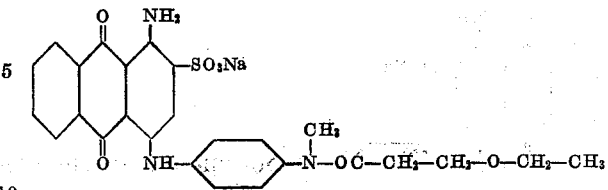

Example 10:

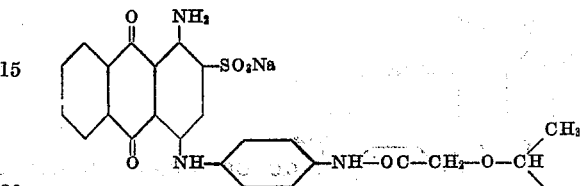

Having thus disclosed the invention what is claimed is:

1. A blue leveling dyestuff of the anthraquinone series which corresponds to the formula

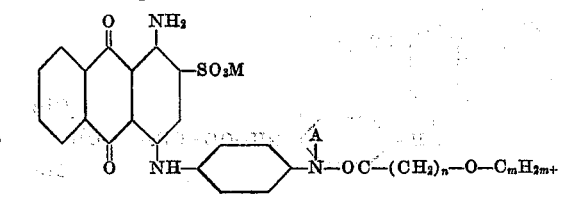

wherein A represents a member selected from the group consisting of hydrogen and methyl, M represents a monovalent cation, $n$ represents one of the integers 1 and 2, and $m$ represents one of the integers 2, 3, 4 and 5.

2. The blue leveling dyestuff of the anthraquinone series which corresponds to the formula

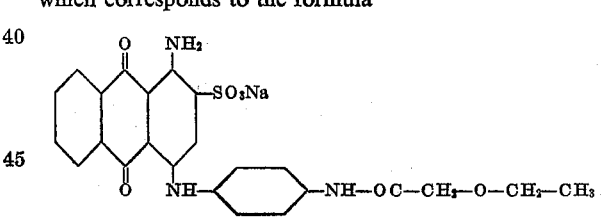

3. The blue leveling dyestuff of the anthraquinone series which corresponds to the formula

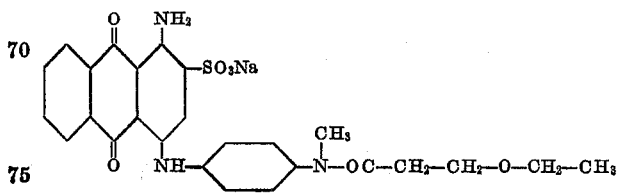

4. The blue leveling dyestuff of the anthraquinone series which corresponds to the formula
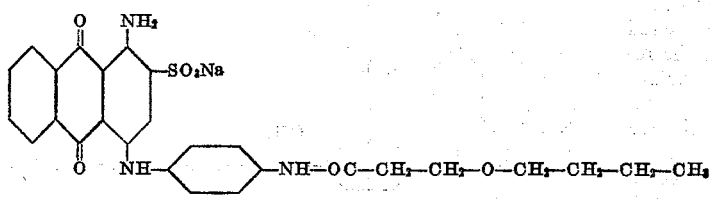
5. The blue leveling dyestuff of the anthraquinone series which corresponds to the formula
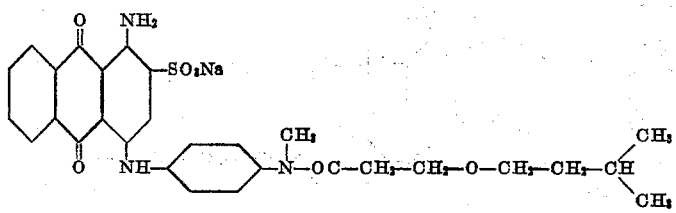
6. The blue leveling dyestuff of the anthraquinone series which corresponds to the formula
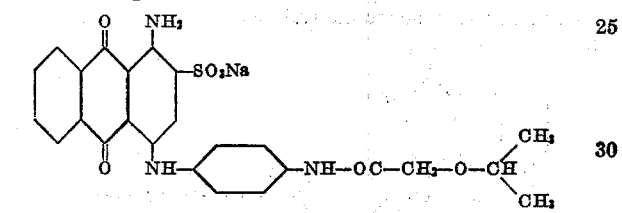
References Cited in the file of this patent
UNITED STATES PATENTS
1,750,228   Kranzlein et al. ---------- Mar. 11, 1930